United States Patent [19]
Watanabe et al.

[11] Patent Number: 6,128,106
[45] Date of Patent: *Oct. 3, 2000

[54] SHEET CONVEYING APPARATUS

[75] Inventors: Masao Watanabe, Kawasaki; Shizuo Hasegawa, Urayasu; Masatoshi Yaginuma, Tokyo; Hirokazu Kodama, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/590,437

[22] Filed: Jan. 23, 1996

[30] Foreign Application Priority Data

Jan. 27, 1995 [JP] Japan ................... 7-012036

[51] Int. Cl.$^7$ ........................................ H04N 1/04
[52] U.S. Cl. .................................... 358/498; 358/486
[58] Field of Search ................... 358/406, 409, 358/486, 496, 498; 399/16, 17, 372, 396; 271/270, 217, 271, 272; H04N 1/00, 1/04

[56] References Cited

U.S. PATENT DOCUMENTS

| | | | |
|---|---|---|---|
| 4,349,847 | 9/1982 | Traino | 358/293 |
| 4,578,577 | 3/1986 | Noguchi | 358/496 |
| 4,591,727 | 5/1986 | Gaebelein | 358/496 |
| 4,761,622 | 8/1988 | Yoshimoto et al. | 346/108 |
| 4,831,420 | 5/1989 | Walsh et al. | 355/203 |
| 4,837,636 | 6/1989 | Daniele et al. | 358/308 |
| 5,043,744 | 8/1991 | Fantuzzo et al. | 358/409 |
| 5,043,771 | 8/1991 | Shibata et al. | 271/217 |
| 5,130,525 | 7/1992 | Ryon | 358/406 |
| 5,167,409 | 12/1992 | Higata | 271/225 |
| 5,266,976 | 11/1993 | Ohigashi et al. | 346/157 |
| 5,327,252 | 7/1994 | Tsuruoka et al. | 358/406 |
| 5,365,323 | 11/1994 | Ando | 271/270 |
| 5,387,980 | 2/1995 | Baitz et al. | 358/498 |
| 5,520,383 | 5/1996 | Amagai et al. | 271/272 |
| 5,539,532 | 7/1996 | Watanabe | 358/486 |
| 5,555,084 | 9/1996 | Vetromile et al. | 355/317 |
| 5,568,227 | 10/1996 | Wong | 355/200 |

FOREIGN PATENT DOCUMENTS 55-83368  6/1980  Japan ................... 358/498

*Primary Examiner*—Madeleine Nguyen
*Attorney, Agent, or Firm*—Fitzpatrick, Cella, Harper & Scinto

[57] ABSTRACT

A sheet conveying apparatus which can correct a conveying velocity of a sheet is constructed by, a conveying unit to convey the sheet, a reader such as a CCD linear sensor for reading a fringe pattern formed on a pattern sheet while the pattern sheet is conveyed by the conveying unit, a detector to detect a conveying velocity of the pattern sheet on the basis of the pattern read by the reader, and a controller to control a conveying velocity of the conveying unit on the basis of the conveying velocity detected by the detector.

40 Claims, 14 Drawing Sheets

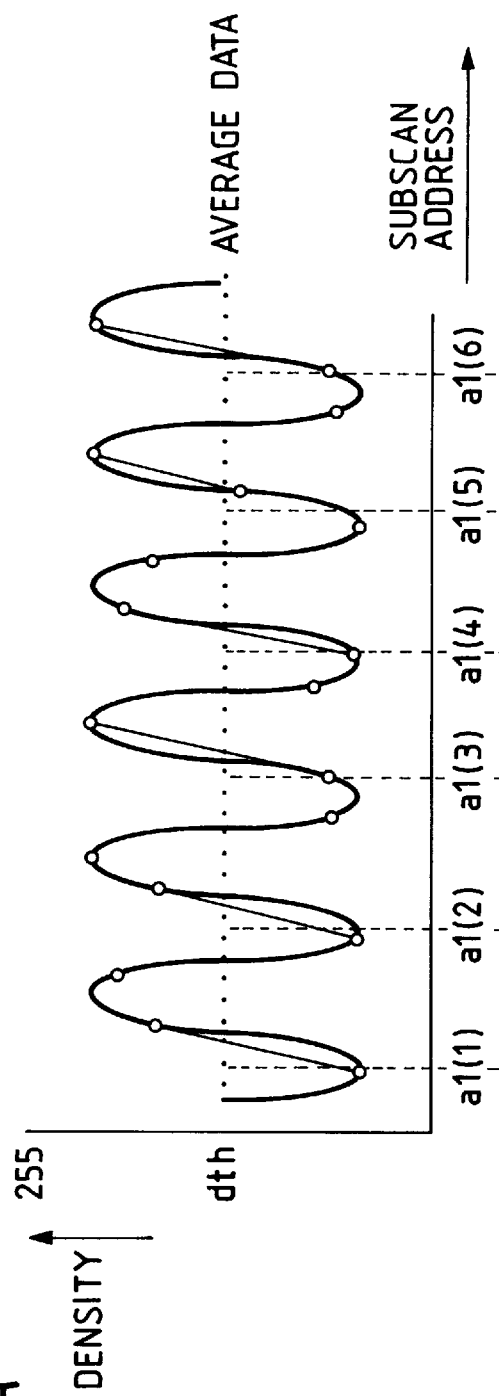
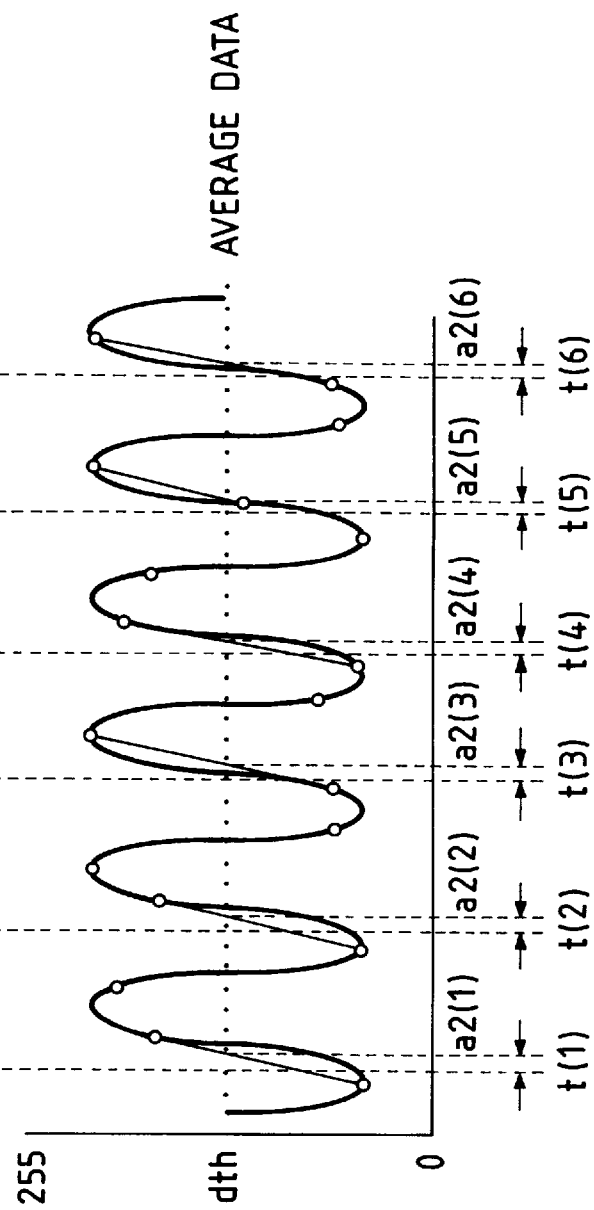
FIG. 7A
FIG. 7B

SHEET CONVEYING APPARATUS

BACKGROUND OF THE INVENTION

1. Field of the Invention

The invention relates to a sheet conveying apparatus which can correct a conveying velocity of a sheet.

2. Related Background Art

Hitherto, in a sheet conveying apparatus, there is no method of correcting a variation in conveying velocity due to an abrasion or tolerance of rollers of a conveying system of a sheet material, and the conveying velocity of the sheet material depends on a precision of the roller.

Therefore, in what is called a flow-read image reading apparatus or the like in which an original is read while moving the original, the velocity changes during the reading of the original due to a variation in conveying velocity of each of a plurality of conveying sections when the flow-read is performed, so that an adverse influence is largely exerted on a read image. It is, accordingly, demanded to solve the above problem so as to always keep the conveying velocity constant even if there is an abrasion or a tolerance in the rollers of the conveying system.

SUMMARY OF THE INVENTION

It is an object of the invention to provide a sheet conveying apparatus which can solve the above problem.

Another object of the invention is to provide a sheet conveying apparatus which can correct a deviation from a predetermined conveying velocity which is caused due to an abrasion or a tolerance of a sheet conveying section.

The above and other objects and features of the present invention will become apparent from the following detailed description and the appended claims with reference to the accompanying drawings.

BRIEF DESCRIPTION OF THE DRAWINGS

FIGS. 7A and 7B are graphs for explaining a time delay of a signal due to a difference of the reading position of a CCD image sensor and the contents of calculating processes in the first embodiment of the invention;

DETAILED DESCRIPTION OF THE PREFERRED EMBODIMENTS

Embodiments of the invention will now be described in detail hereinbelow with reference to the drawings.

First Embodiment

Figure 1:
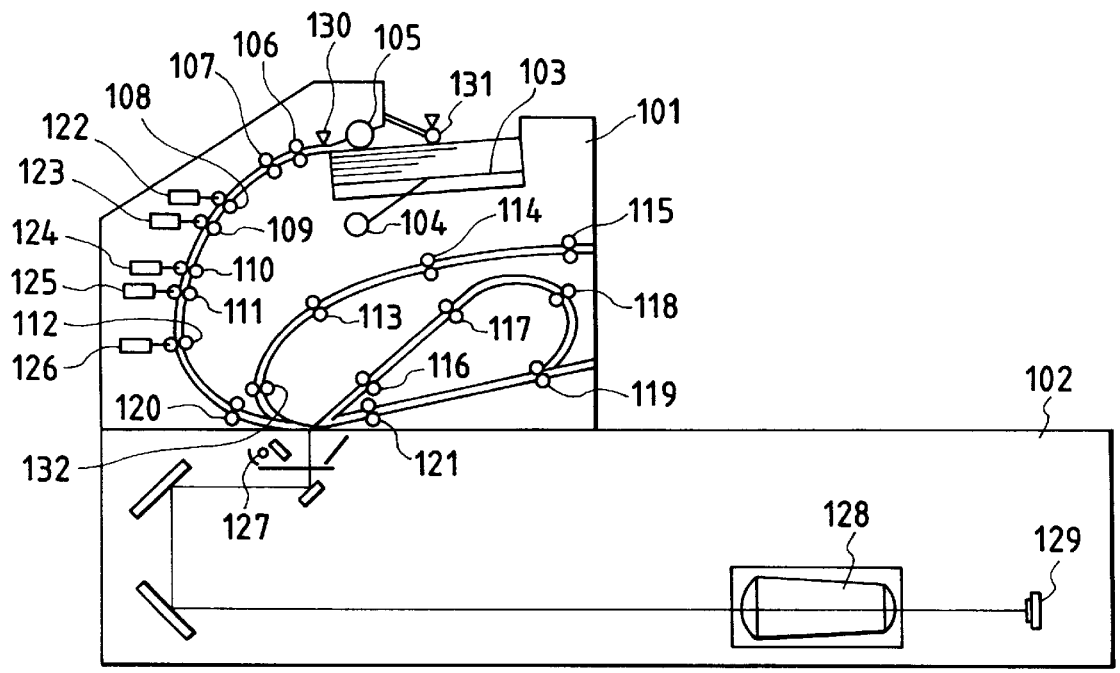
FIG. 1 is a vertical sectional view showing an internal construction of a flow-read original feeding apparatus having an oblique motion correcting mechanism and an original reading apparatus according to an embodiment of the invention.

FIG. 1 shows an internal construction of a flow-read original feeding apparatus having an oblique motion correcting mechanism and a scanner according to an embodiment of the invention. In FIG. 1, reference numeral 101 denotes an original feeding apparatus and 102 indicates a scanner main body. The original feeding apparatus 101 will be first described. Reference numeral 103 denotes an original stacking tray; 104 a drive motor to drive a lifter for lifting up or down the original stacking tray; 130 a paper sensor; and 131 an encoder and a photo-interrupter. Reference numeral 105 denotes a paper feed roller; 106 a separation roller; 107 a pull-out roller; 108, 109, 110, 111, and 112 vertical path convey rollers; and 122, 123, 124, 125, and 126 convey roller pressure release solenoids for selectively releasing pressing forces to the vertical path convey rollers in accordance with a size of original. Further, reference numeral 120 denotes a first oblique motion correction roller for correcting an oblique motion of the original when the surface of the original is read; 116 a first pull-out roller for pulling out the original when the original surface is read; 117 and 118 reversing path convey rollers; 119 a paper ejection reverse roller which is used for both of the paper ejection and the reversal; 121 a second oblique motion correction roller for correcting an oblique motion of the original when the back surface of the original is read; 132 a second pull-out roller for pulling out the original when the back surface of the original is read; and 113, 114, and 115 both-side paper eject path rollers. A flapper which is switched in a one-side reading mode and a both-side reading mode and is used to switch a conveying path is not shown.

The scanner main body 102 will now be described. Reference numeral 127 denotes an original illuminating lamp; 128 a lens for forming an image light from the original as an image; and 129 a CCD (charge coupled device) linear image sensor for reading the image.

In the one-side reading mode for reading only one side of the original, the original which was separated and fed one by one from the original stacking tray 103 by the paper feed roller 105 and separation roller 106 passes along the rollers 107, 108 to 112, 120, 121, and 119 and is conveyed and is ejected to the outside of the apparatus. In the both-side reading mode for reading both sides of the original, the original which was separated and fed one by one from the original stacking tray 103 by the paper feed roller 105 and separation roller 106 passes along the rollers 107, 108 to 112, and 120. The original further passes along the rollers 116, 117, 118, 119, and 121 and subsequently passes along the rollers 132, 113, 114, and 115 and is conveyed and is ejected out from the apparatus.

The original which is continuously moved as mentioned above is illuminated by the original illuminating lamp 127 at a flow-read image reading position locating between the first and second oblique motion correction rollers 120 and 121. The reflection light is formed as an image onto the CCD linear image sensor 129 through the lens 128. An image signal corresponding to the original image is derived from the sensor.

Figure 2:
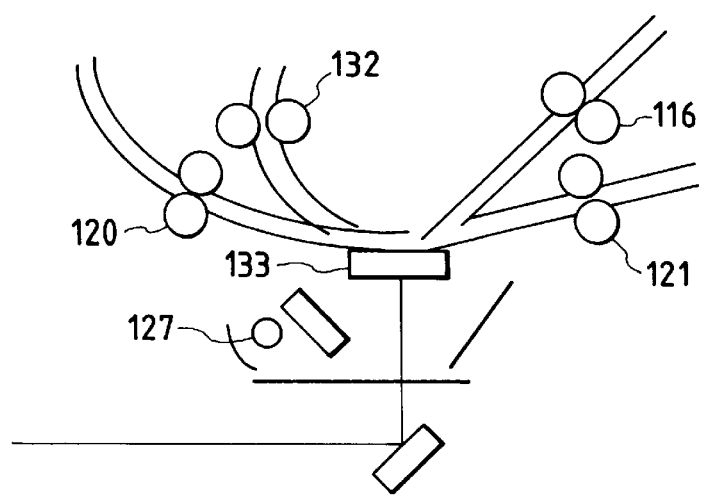
FIG. 2 is an enlarged diagram of a flow-read section in FIG. 1.

FIG. 2 enlargedly shows the flow-read image reading section of the scanner main body 102 mentioned above. Reference numeral 133 denotes a flow-read image reading position locating between the first and second oblique motion correction rollers 120 and 121.

Figure 3A:
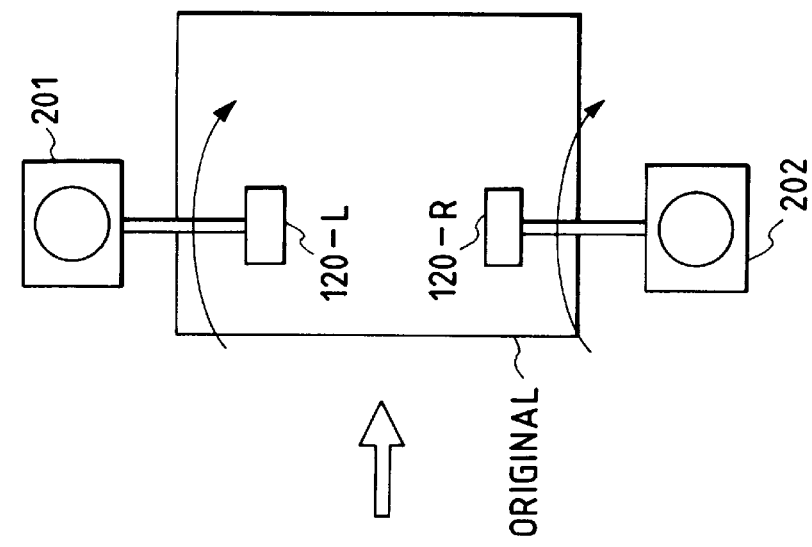
FIGS. 3A, 3B, and 3C are plan views showing a structure of the oblique motion correcting mechanism arranged near the flow-read section in FIG. 2 and a principle of the oblique motion correcting operation.
Figure 3B:
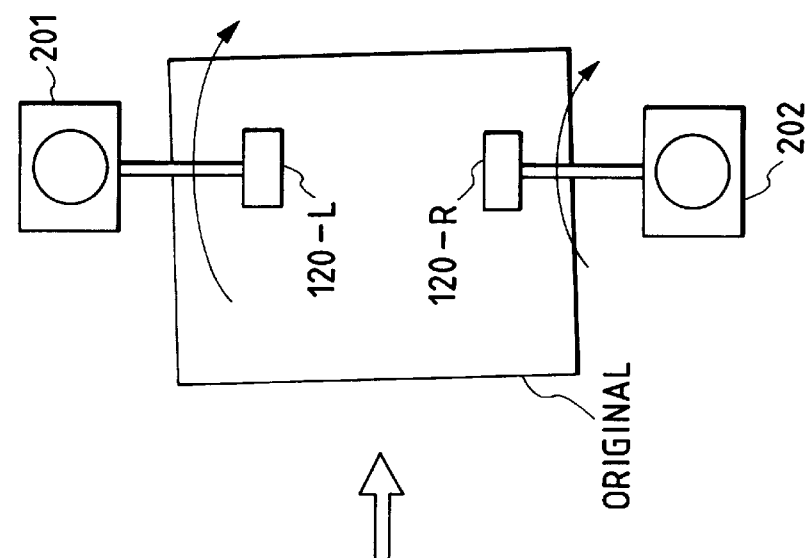
Figure 3C:
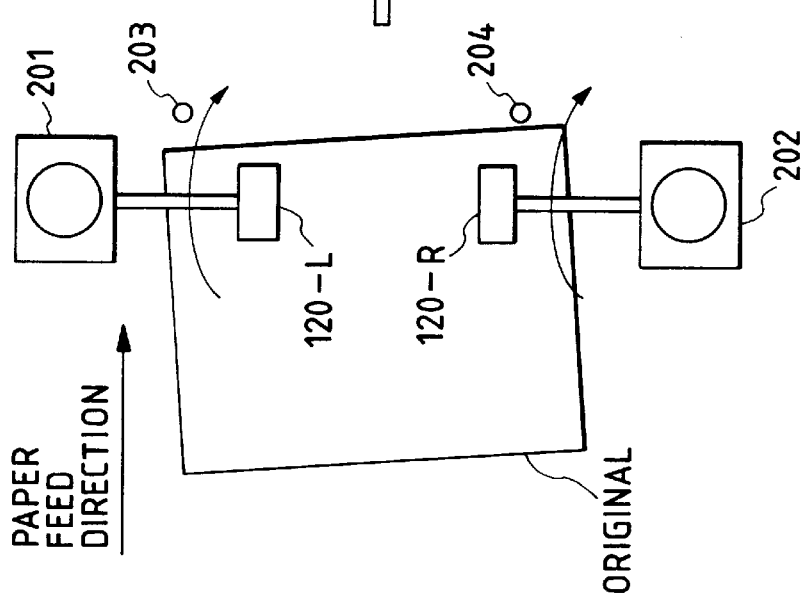

Since the first oblique motion correction roller 120 to correct the oblique motion of the original when the surface of the original is read and the second oblique motion correction roller 121 for correcting the oblique motion of the original when the back surface of the original is read have substantially the same structure, a constructional example of the first oblique motion correction roller 120 and the operation for correcting the oblique motion are shown as a representative in FIGS. 3A, 3B, and 3C. As shown in the diagrams, the oblique motion correction roller 120 comprises a pair of rollers 120-L and 120-R arranged on a conveying path on both of the left and right sides and in the direction perpendicular to the conveying path. The roller 120 changes rotational speeds of motors 201 and 202 as drive sources of the rollers in accordance with an oblique motion amount of a sheet material (original) which is conveyed, thereby correcting the oblique motion as shown in FIGS. 3B and 3C. The oblique motion amount is detected by a pair of sensors 203 and 204 arranged on a conveying path near the rollers 120-L and 120-R and in the direction perpendicular to the conveying path on the basis of a time difference between the times at which the front edge of the sheet material is detected.

As mentioned above, after the oblique motion of the original was corrected by the oblique motion correction rollers 120-L and 120-R, the image on the surface is read at the reading position 133. The read original is pulled out by the first pull-out roller 116. Similarly, the oblique motion of the reversed original is corrected by a pair of rollers 121-L and 121-R (not shown) of the second oblique motion correction roller 121. After that, the image on the back surface is read at the reading position 133. The read original is pulled out by the second pull-out roller 132. Therefore, since fluctuations of the speeds of the oblique motion correction rollers 120-L, 120-R, 121-L, and 121-R and fluctuations of the speeds of the pull-out rollers 116 and 132 are directly concerned with a fluctuation of the conveying velocity of the original when it passes through the reading position 133, a large influence is exerted on the read image as already mentioned in the description of the related background art.

Figure 4:
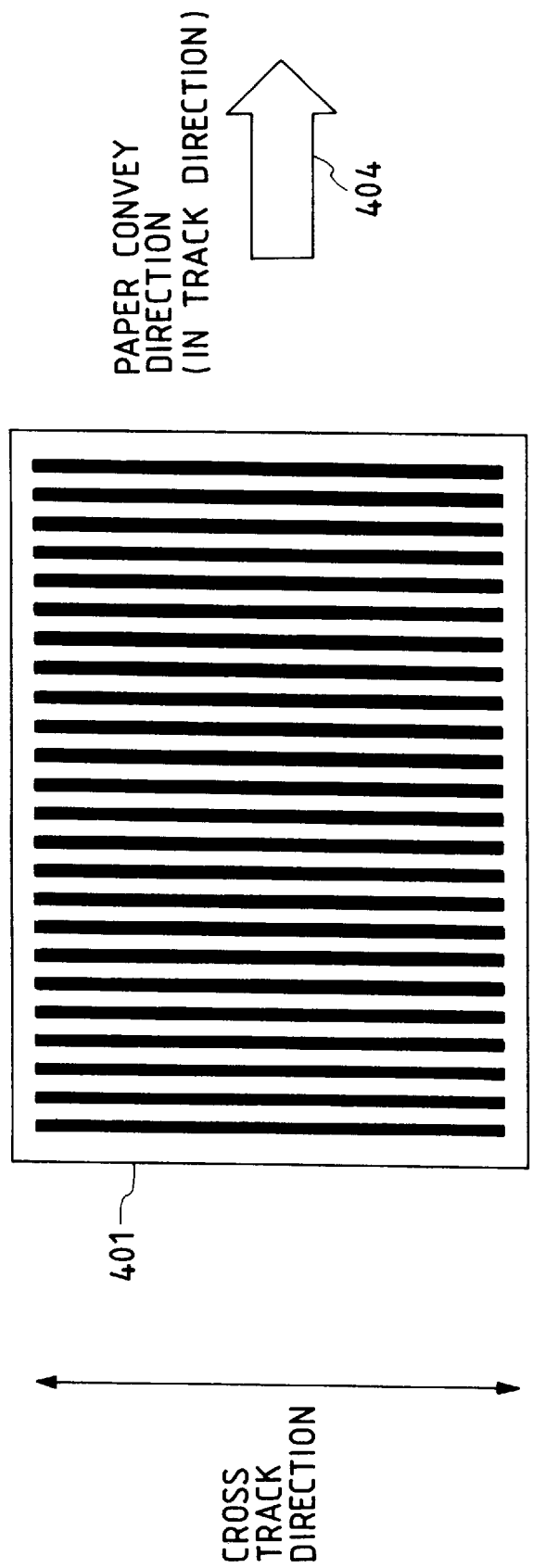
FIG. 4 is a plan view showing an example of an exclusive-use chart for detecting a conveying velocity which is used in the embodiment of the invention.
Figure 5:
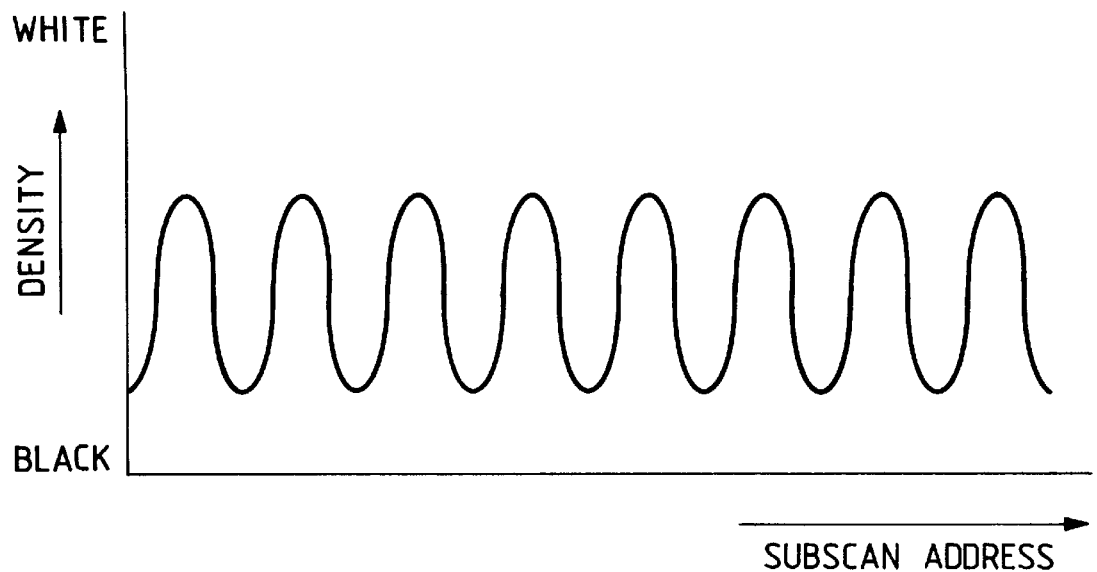
FIG. 5 is a graph showing a waveform of density data in the subscan direction when the exclusive-use chart in FIG. 4 is read.

FIG. 4 shows an example of an exclusive-use chart for detecting the conveying velocity of the original by using the CCD linear image sensor 129 for reading the image. Black and white stripes (black and white fringe patterns) are printed on an exclusive-use chart 401 for detecting the conveying velocity at predetermined regular intervals along the direction (called a cross track direction) perpendicular to the direction (paper convey direction and called an intrack direction) of the conveying path (track). FIG. 5 shows a density data in the subscan direction when the repetitive pattern of the chart 401 is flow-read by the image sensor 129.

Figure 6:
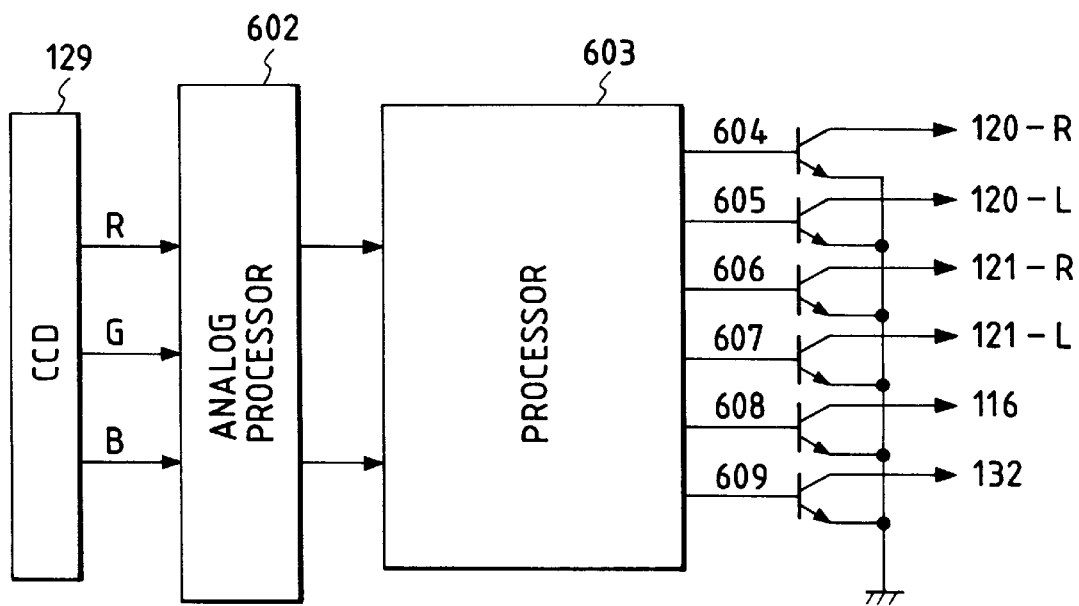
FIG. 6 is a block diagram showing a construction of a processing circuit in the first embodiment of the invention.

FIG. 6 shows a construction of a main section of a control system of the apparatus of the embodiment. When the exclusive-use chart 401 is inserted from the original stacking tray 103 and is flow-read, analog image signals for three lines of R (red), G (green), and B (blue) are outputted from the CCD linear image sensor (hereinafter, abbreviated to CCD) 129. The outputs for three lines are converted into the digital signals by an analog processor 602. Further, the analog processor 602 extracts the signals in the subscan direction among the signals converted to the digital signals with respect to two lines of (R and G), (R and B), or (G and B) and supplies to a processor 603. The processor 603 calculates the subscan signals between those two lines, thereby calculating the conveying velocity. An algorithm of the calculation will be explained hereinlater.

When the CCD 129 is constructed by a plurality of lines of two or more lines and the reading position is away by only a line interval, the calculation in the embodiment can be performed. Further, the conveying velocity can be also calculated by a CCD of a one-line sensor. A method in this case will be explained hereinlater.

When the reading position 133 in FIG. 2 is away by only the line interval of the CCD 129, the signal in the subscan direction in FIG. 5 is also shifted in the lateral axis direction by only the line interval. FIGS. 7A and 7B show shift amounts in this case. a1(1), a1(2), a1(3), a1(4), a1(5), and a1(6) in FIG. 7A and a2(1), a2(2), a2(3), a2(4), a2(5), and a2(6) in FIG. 7B indicate subscan addresses (line numbers) of the pixels at the average data level obtained by linearly interpolating the pixels.

The processor 603 calculates the conveying velocity on the basis of the subscan addresses (line numbers). Namely, as shown in a flowchart of FIG. 8, the processor 603 first obtains average densities (average data) with respect to the subscan data for two lines of the CCD 129, respectively (step 801).

Addresses which intersect with the average densities are subsequently calculated. Actually speaking, as shown in FIGS. 7A and 7B, intersections a1(n) and a2(n) of the straight lines obtained by the linear interpolation and the average densities are individually calculated (step 802). n is a natural number of 1, 2, 3, . . . . In the example, although the intersections between the average densities and the linear interpolated straight lines have been calculated, by calculating the average density as a fluctuation level (spline function) or by using a spline interpolation as an interpolating method, a precision is further improved.

Subsequently, as shown in FIGS. 7A and 7B, by obtaining a difference $$t(n)=\{a1(n)-a2(n)\}$$

between a line 1 (FIG. 7A) and a line 2 (FIG. 7B) with respect to the calculated intersections (subscan addresses), a change in conveying velocity of the sheet material (original) is obtained (step 803).

Assuming that the conveying velocity is constant, the difference t(n) between the lines 1 and 2 always ought to be the line interval on the CCD 129. A velocity V(n) is obtained from a line interval (the number of lines) K and the difference t(n) by the following calculation (step 804).

$$V(n)=K/t(n)$$

Figure 9A:
FIGS. 9A and 9B are graphs showing calculation results in the first embodiment of the invention.

An example of the calculation result is shown in FIG. 9A.

Figure 9B:
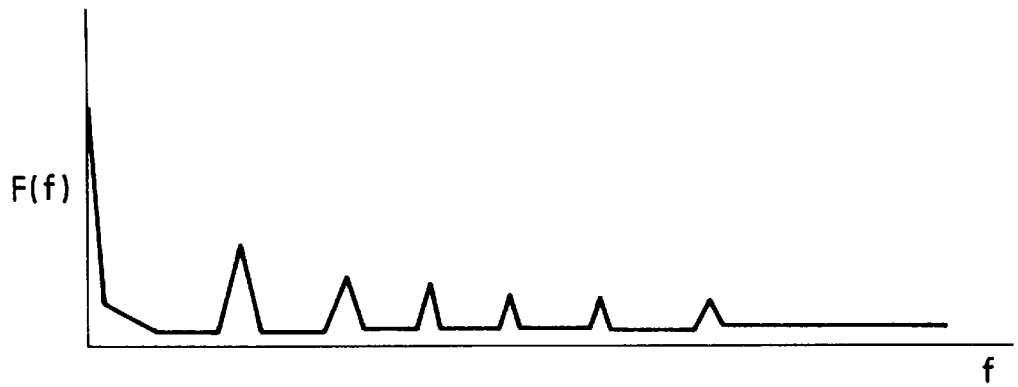

Further, the velocity data V(n) is frequency analyzed by an FFT (fast Fourier transform) calculation by using a DFT (discrete Fourier transform) system and the result is shown in a waveform of FIG. 9B (step 805).

The conveying velocity is obtained from the above calculations. On the basis of the conveying velocity data, the processor 603 adjusts a motor drive clock of motors for driving the rollers 120-R, 120-L, 121-R, 121-L, 116, and 132 (step 806). That is, when the conveying velocity obtained by the above calculations is higher than a preset velocity, the processor 603 performs a control to delay the motor drive clock so as to reduce a rotational speed of the motor, thereby setting the conveying velocity to a predetermined velocity. Similarly, when the conveying velocity is lower than the preset velocity, the processor 603 performs a control to advance the motor drive clock, thereby setting the conveying velocity to the predetermined velocity. Such a control can be certainly executed by using, for example, a lookup table.

When a 1-line sensor is used as a CCD 129, by reading the chart 401 twice with a time difference, a calculation similar to that mentioned above can be performed. There is, however, a possibility such that a print fluctuation due to the chart 401 exerts an influence.

Figure 10:
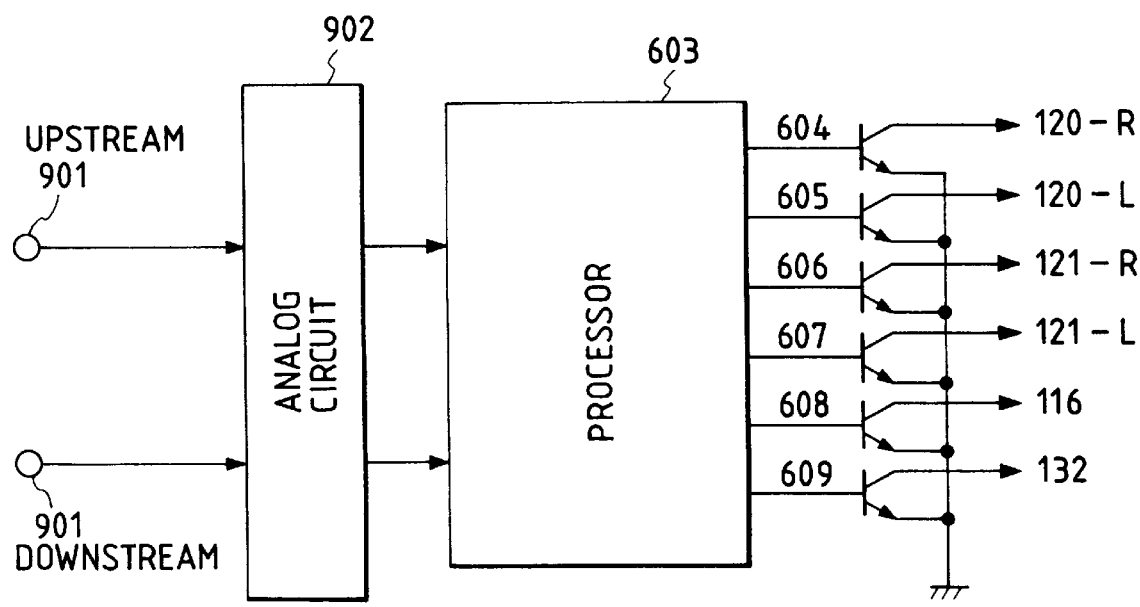
FIG. 10 is a block diagram showing a construction of processing means in the first embodiment of the invention in case of constructing by a reflecting type photosensor without using a CCD image sensor.

As a sensor for detecting the conveying velocity of the original, in place of using the CCD 129 for reading the image, as shown in FIG. 10, exclusive-use reflecting type photo-interrupters 901 to detect the conveying velocity are arranged at two upstream and downstream positions of the conveying path (for example, two positions near the flow-read image reading position 133) and outputs of those photo-interrupters are inputted to an analog circuit 902, so that a calculation and an adjustment of the conveying velocity which are similar to those mentioned above can be performed.

Figure 11:
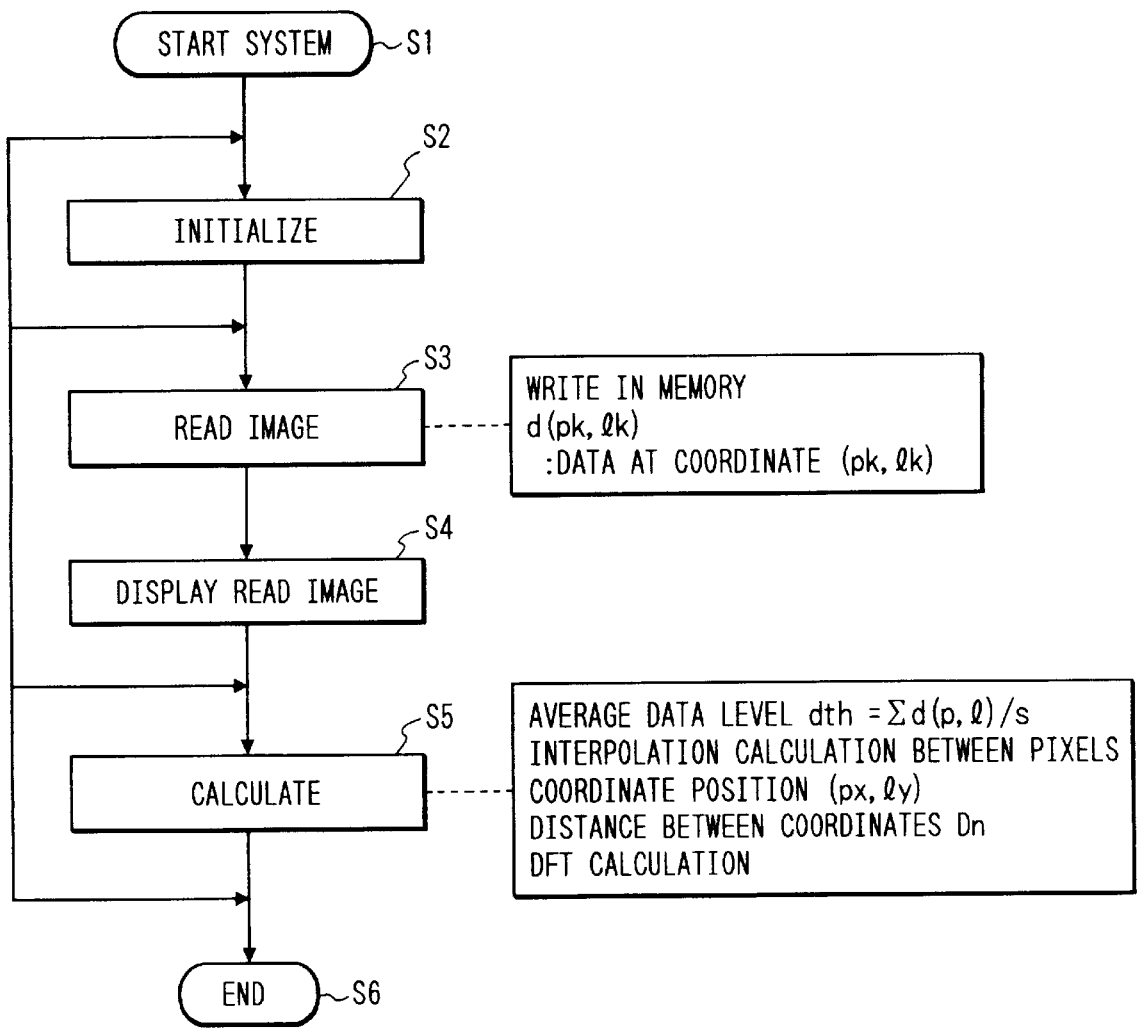
FIG. 11 is a flowchart showing a whole processing procedure of the first embodiment of the invention.

Although the main section of the operation in the embodiment has been described with reference to the flowchart of FIG. 8, a whole control procedure of the invention will be further described in detail with reference to flowcharts of FIGS. 11 to 14. FIG. 11 shows a flow of the whole operation of the embodiment. The details of the processing procedure in each step will be described in FIGS. 12 to 14. Reference numerals S1 to S6, S11 to S19, S21 to S26, and S31 to S38 denote processing steps, respectively.

In FIG. 11, the processing routine is started in S1 and an initialization is first executed in S2. In accordance with setting values based on the initialization, the image is read into an internal memory (not shown) in S3. The read image is displayed on a display (not shown) of a console panel in S4. In S5, the user sets a portion of the displayed image which the user wants to calculate and calculations such as average data level, interpolation calculation among pixels, a coordinate position, a distance between coordinates, a DFT calculation, and the like, which will be explained hereinlater, are executed with respect to the set portion.

When desired calculation results are not obtained in S5, the processing routine is returned to S2 or S3 and the initialization and image reading can be again executed. Only the calculation in S5 can be also again performed.

Figure 12:
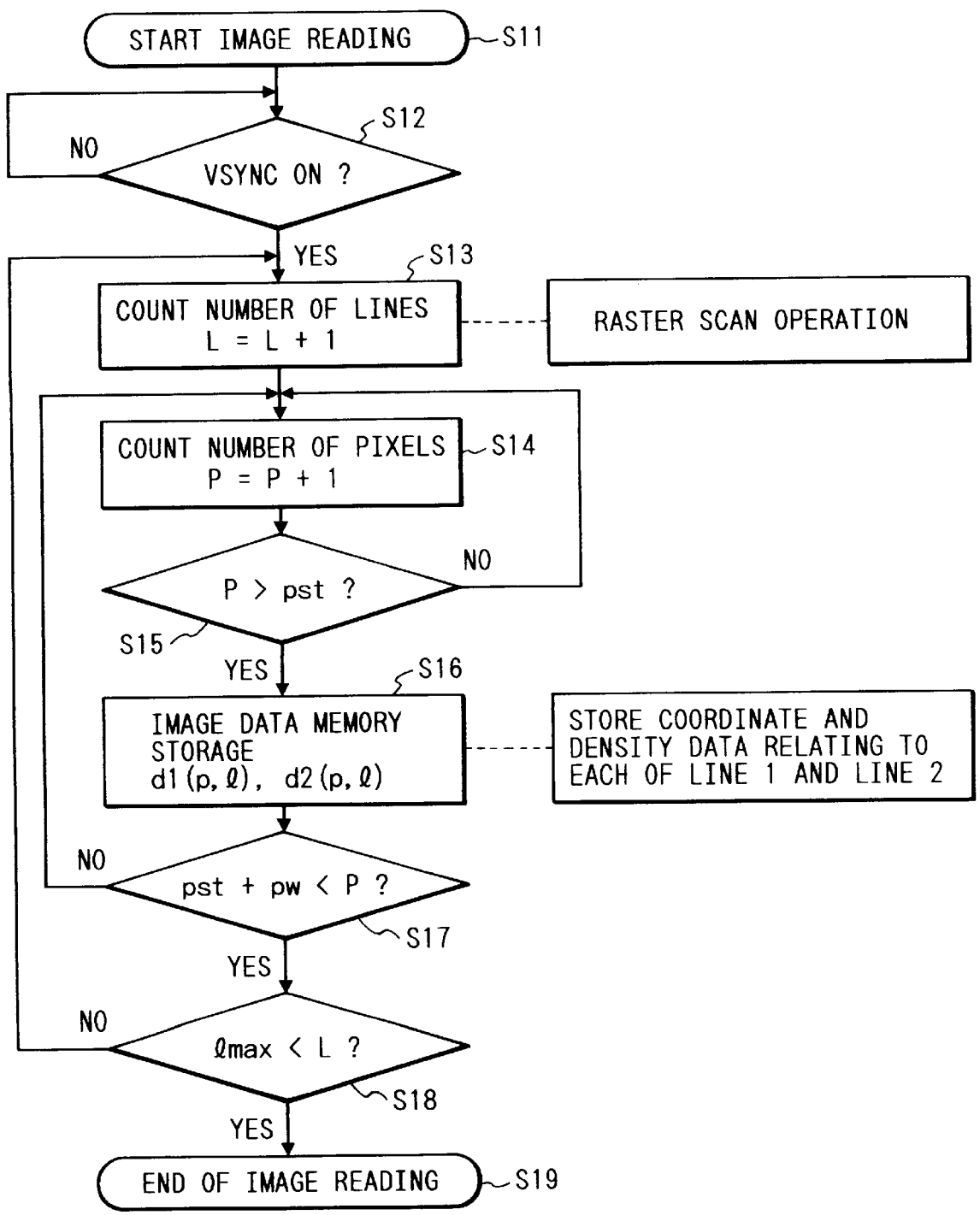
FIG. 12 is a flowchart showing the details of a processing procedure for an image reading in step S3 in FIG. 11.

A flowchart of FIG. 12 shows the details of the image reading in S3 in FIG. 11. First, a check is made in S12 to see if a page sync signal (vertical sync signal VSYNC) of the image to be read has been received. Since the image reading is performed by using the page sync signal as a trigger, a flow of NO (negative judgment) is repetitively executed until the page sync signal is received.

When the page sync signal is received in S12, the number of lines is counted in S13. In this step, the line number L of the image to be read by a raster scanning operation is counted. In S14 for counting the number of pixels, the pixel number P in one line of the raster scan is counted. Thus, addresses in the Y and X directions of the image to be read are allocated on the basis of both of the count value L indicative of the number of lines in S13 and the count value P indicative of the number of pixels in S14 and a bit map is formed.

In S15, which pixel number the pixel to start the reading in one line has is determined. In case of reading from, for example, the 200th pixel, the count value of the number of pixels is increased in S14 until the count value reaches 200 pixels.

In S15, when the pixel number count value P reaches a predetermined reading start pixel number pst, the image data is stored into a memory (not shown) in S16. d1(p, 1) and d2(p, 1) shown in S16 denote density data at coordinates (p, 1) which were read from the two image reading CCDs 129, respectively. Those density data is stored into the memory.

When the density data at the coordinates of (p, 1) is accumulated in S16, in order to read the next pixels in the same line, the processing routine is returned to S14 from S17. At this time, a width (pw) of pixel to be read is checked in S17. Now, assuming that the image for one line is read at a width of 100 pixels from the 200th pixel in the foregoing example, the pixels are counted until the count value of the pixel number counter (P) reaches 300 in S14. After that, the processing routine advances to S18 from S17.

In S18, a check is made to see if the data for a preset line number (lmax) has been read. The processes in steps S13 to S17 are repeated until the number of lines reaches the preset line number. By executing the processing routine in FIG. 12, the image data in a preset region is stored into the memory.

Figure 13:
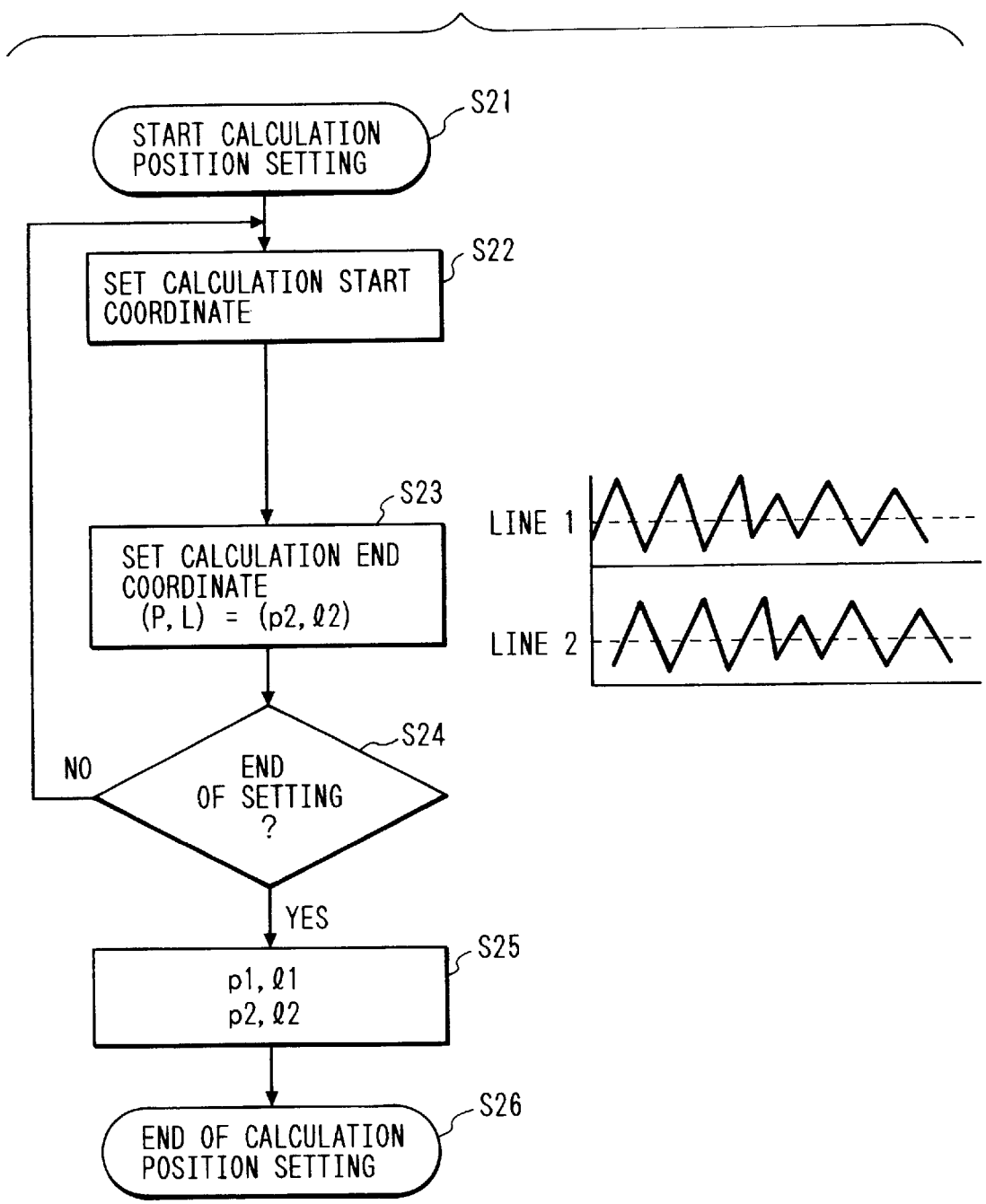
FIG. 13 is a flowchart showing the details of a processing procedure for setting a calculation position at the front stage in a calculating process in step S5 in FIG. 11.

A flowchart of FIG. 13 shows a processing procedure of a portion to set the coordinates of a calculation position in the process in S5 in FIG. 11. In S22 (setting of the coordinates to start the calculation) and S23 (setting of the coordinates to finish the calculation), the user sets whether the calculation is executed in a range from which coordinates to which coordinates of the image data read in the memory by the processes in FIG. 12 mentioned above. In the diagram, (P, L) denote image data which was read; (p1, 11) indicate calculation start coordinates; (p2, 12) show calculation end coordinates. The above setting can be performed by a keyboard (not shown) or a mouse click (not shown) on the display.

When a desired calculation position is not set, the judgment result is "NO" in S24, so that the setting operation from S22 is again executed. The coordinates which were set as mentioned above are stored into a predetermined register portion or a predetermined area in the memory in S25.

Figure 14:
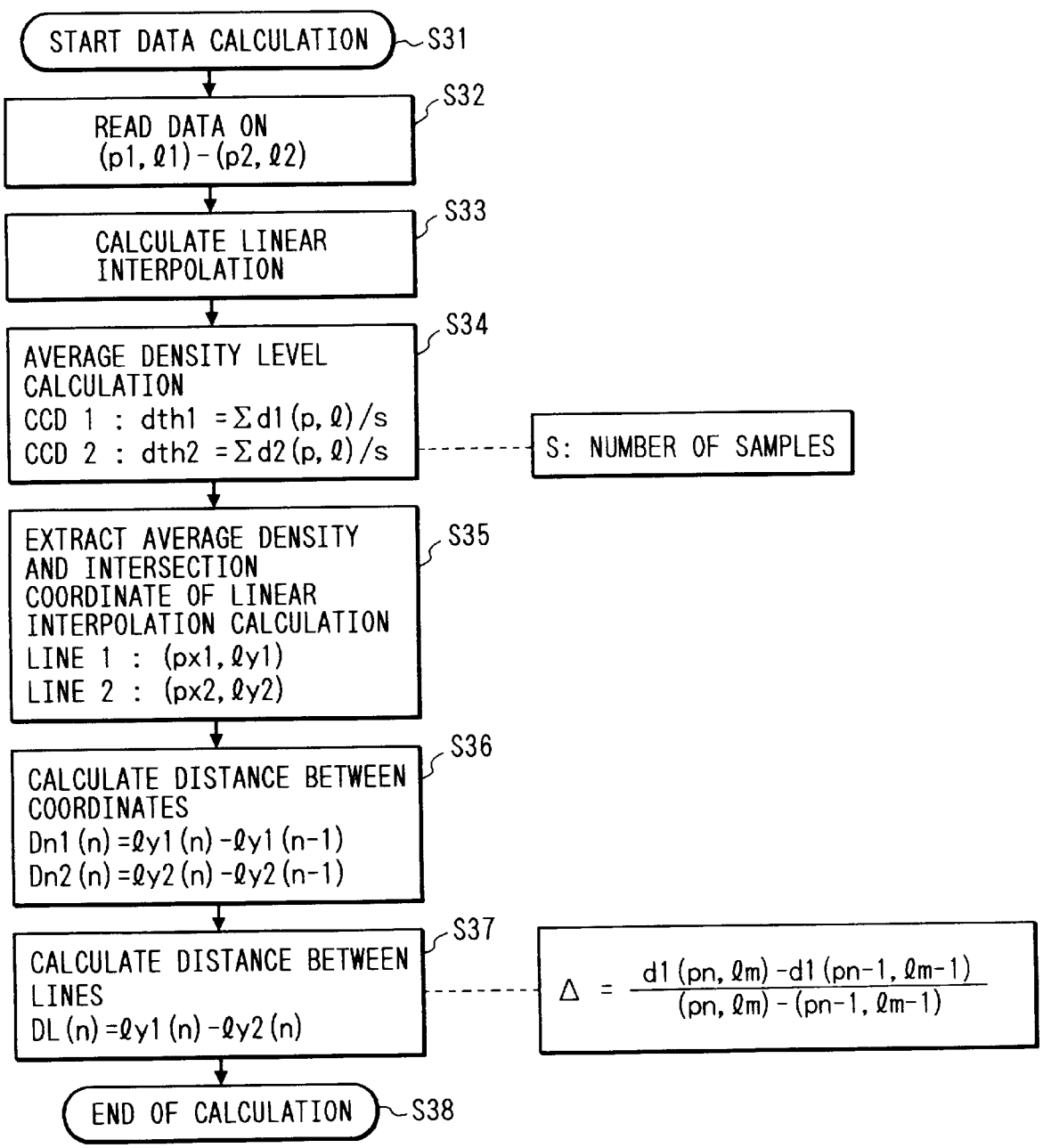
FIG. 14 is a flowchart showing the details of a processing procedure for a data calculation at the post stage in the calculating process in step S5 in FIG. 11.

A flowchart of FIG. 14 shows the details of a portion to actually execute the calculation in the process in S5 in FIG. 11. In S32, the image density data in the range set by the foregoing calculation position setting operation is read out from the memory. In S33, a linear interpolation calculation is performed in order to obtain a density of each point in the range obtained in S32. Although the actual density at each point has been preserved on the bit map, the position set by the calculation position setting operation is not always set to an integer address. Therefore, the density on the set range is interpolated by the linear interpolation calculation.

In S34, the average density of the image density data in the calculation range which was read out in S32 is obtained. That is, the total of the densities is divided by the number(s) of pixels of the CCD, thereby obtaining average densities (dth1, dth2) every two CCDs (every line).

In S35, coordinates of the intersection between the average density level derived in S34 and the coordinates of the density data obtained by the linear interpolation in S33 are calculated.

In S36, a distance between the intersection coordinates obtained in S35 is subsequently calculated. In S37, a distance between the first and second CCDs (called an interline distance) of the intersection coordinates obtained in S35 is calculated.

Figure 8:
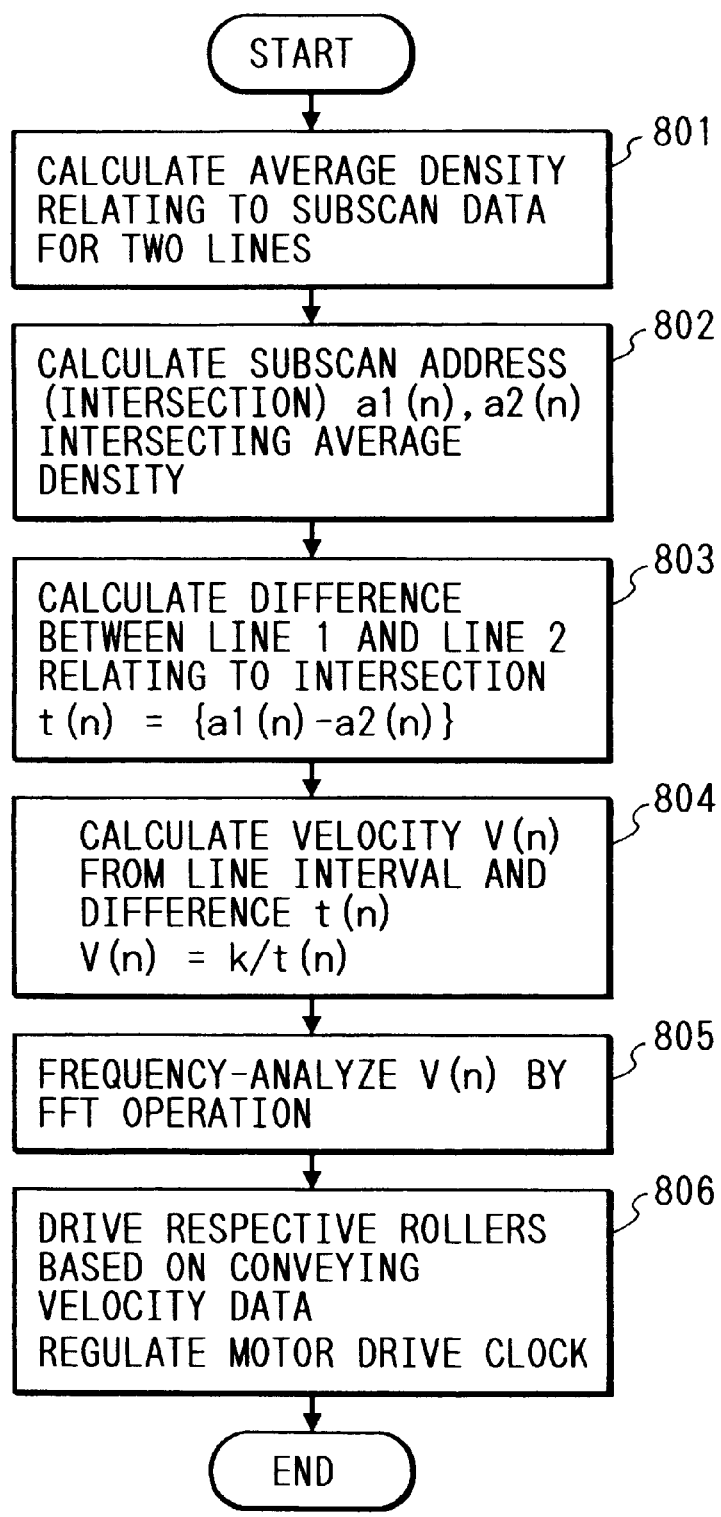
FIG. 8 is a flowchart showing a main section of a procedure for a calculation control in the first embodiment of the invention.

When comparing with the flowchart of FIG. 8 mentioned above, it will be understood that S34, S35, and S36 respectively correspond to steps 801, 802, and 803.

Second Embodiment

Although the first embodiment of the invention mentioned above has been shown and described with respect to an example in which the calculation control was realized by using a software, such a calculation control can be realized by constructing a similar algorithm by hardware. Such a specific example will now be described as a second embodiment of the invention with reference to FIGS. 15, 16, and 17.

Figure 15:
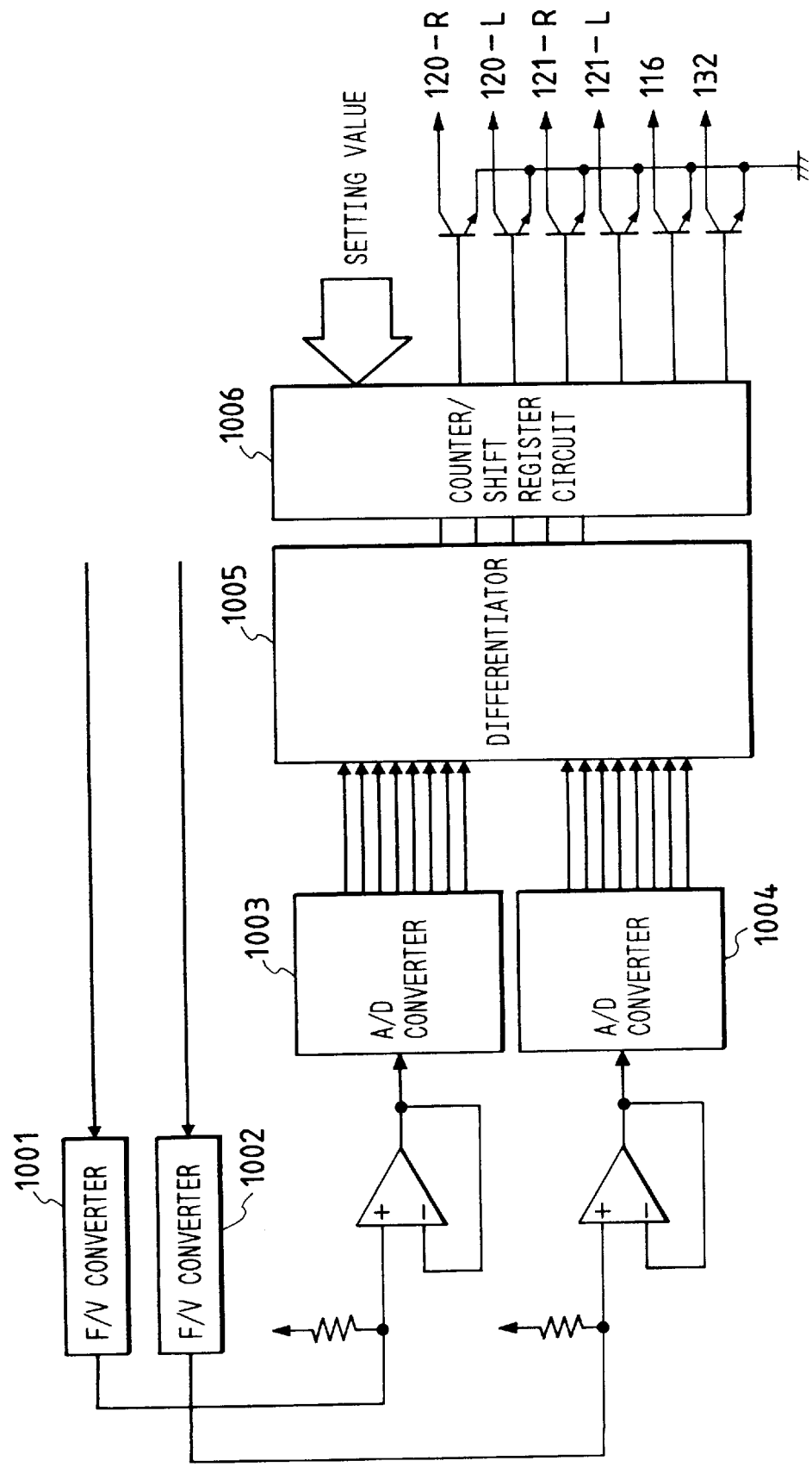
FIG. 15 is a block diagram showing a construction of a processing circuit according to the second embodiment of the invention.

FIG. 15 shows a circuit construction of the second embodiment of the invention. In FIG. 15, reference numerals 1001 and 1002 denote frequency-voltage (F/V) converters; 1003 and 1004 analog-digital (A/D) converters; 1005 a differentiator; and 1006 a counter/shift register circuit.

The subscan density data for two lines shown in FIGS. 7A and 7B mentioned above are inputted every line to the F/V converters 1001 and 1002 and are converted to the analog voltages, respectively. The analog outputs converted by the F/V converters are further converted to the digital values by the A/D converters 1003 and 1004.

Outputs from the A/D converters 1003 and 1004 are inputted as digital values to the differentiator 1005. The differentiator 1005 obtains a difference from the density data of both outputs. The difference value is counted by the counter/shift register circuit 1006, thereby detecting a speed difference. The data of the detected speed difference is fed back to a motor clock in a manner similar to the first embodiment.

Figure 16:
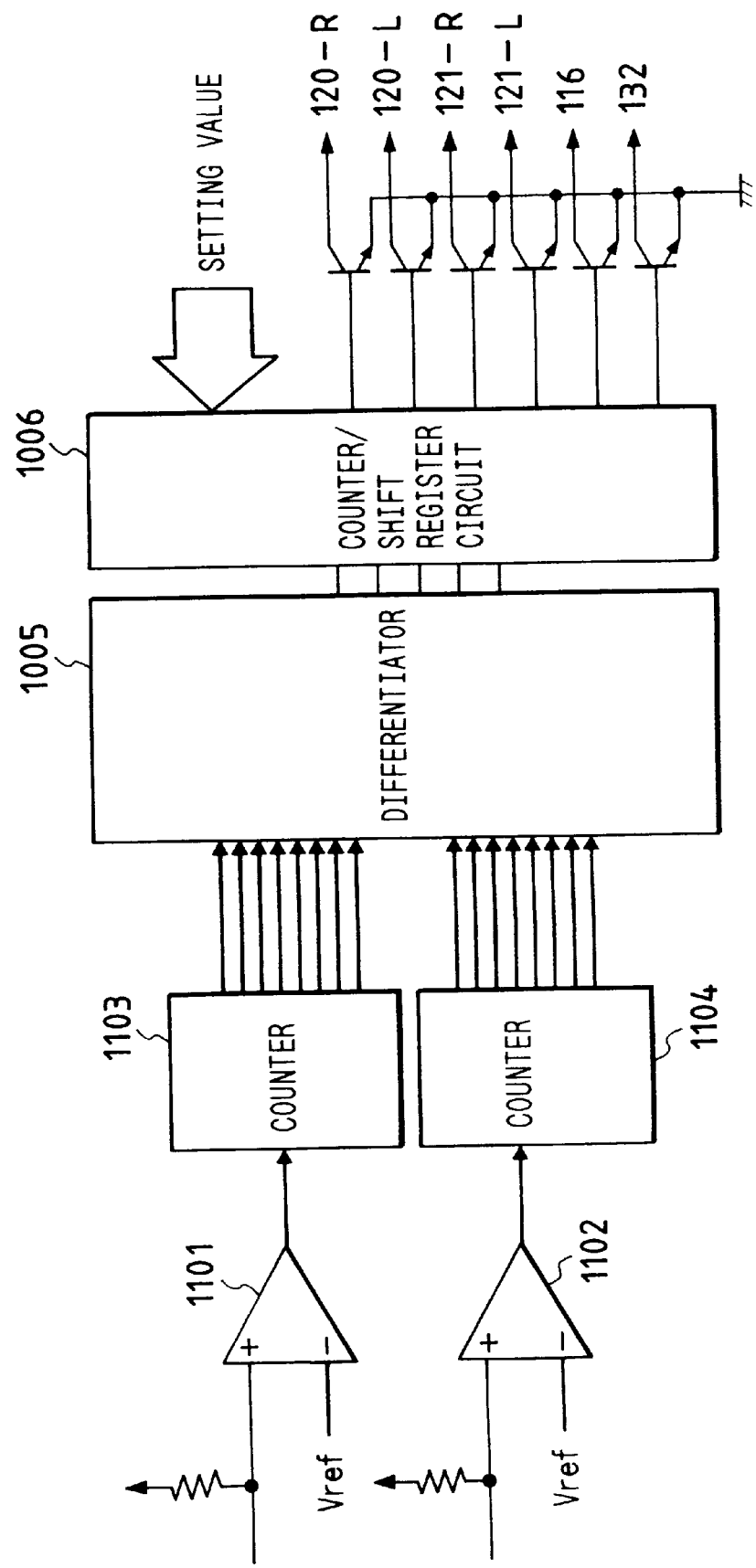
FIG. 16 is a block diagram showing another construction of the processing circuit in the second embodiment of the invention.

FIG. 16 is similar to FIG. 15. The data shown in FIGS. 7A and 7B are first compared with a predetermined value Vref by comparators 1101 and 1102. By counting output signals of the comparators 1101 and 1102 by counters 1103 and 1104, respectively, conveying velocities are respectively detected. Outputs (conveying velocities) from the counters 1103 and 1104 are inputted to the differentiator 1005. The differentiator 1005 obtains a difference between them. The difference value is counted by the counter/shift register circuit 1006, thereby detecting a velocity difference. The data of the detected velocity difference is fed back to the motor clock in a manner similar to the first embodiment.

Figure 17:
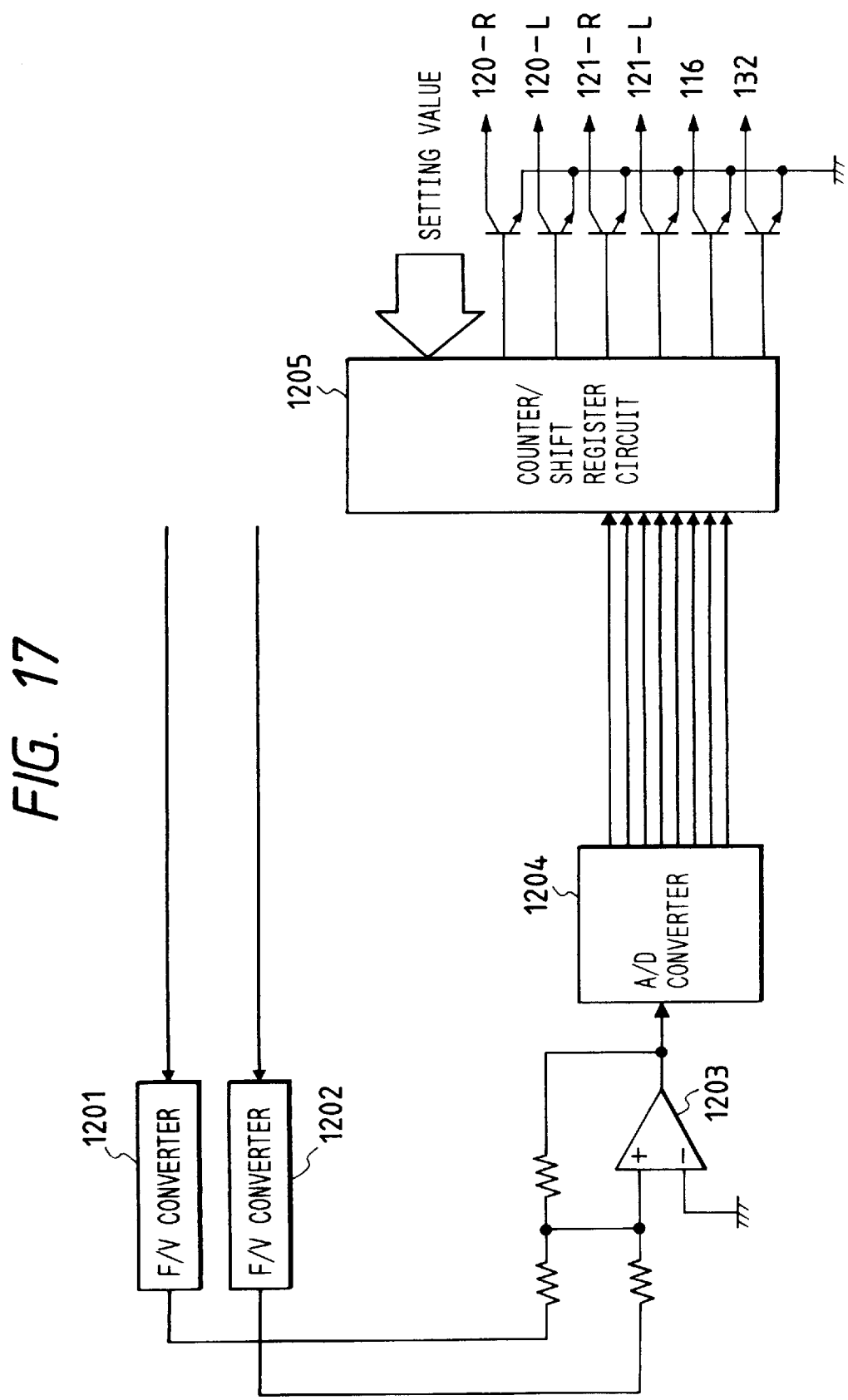
FIG. 17 is a block diagram showing still another construction of the processing circuit in the second embodiment of the invention.

FIG. 17 shows a constructional example for detecting the velocity in an analog manner. The data shown in FIGS. 7A and 7B are inputted to F/V converters 1201 and 1202. Outputs of the F/V converters 1201 and 1202 are inputted to an analog differential amplifier 1203, by which a difference is obtained. The difference value is converted and encoded to the digital value by an A/D converter 1204. By counting the digital value by the counter/shift register circuit 1005, a velocity difference is detected. The data of the detected velocity difference is fed back to the motor clock in a manner similar to the first embodiment.

The embodiments of the invention mentioned above have been shown and described with respect to the example in which the invention was applied to the flow-read original feeding apparatus and the original reading apparatus. The invention, however, is not limited to such an example but can be widely applied to any other image processing apparatuses such as printers including various printing systems, bookbinding apparatus, and the like having a mechanism for conveying a sheet material such as paper, original, or the like. Even when there is an abrasion or a tolerance of the roller or the like of the conveying system of the sheet material, the conveying velocity can be always held constant. It will be obviously understood that operation and effects similar to those of the embodiment of the invention mentioned above such that the reading position and printing position can be more accurately set than the conventional apparatus can be obtained.

As described above, in order to cope with variations and abrasion change of the outer shapes of the rollers of the conveying system, the conveying velocity of the sheet material is detected and the driving speeds of the rollers or the like are variably set in accordance with the detection result. Therefore, the sheet material can be optimally conveyed at a predetermined velocity. The original reading position in the original reading apparatus, facsimile, or the like, the printing position in the printing, or the like can be more accurately set than the conventional apparatus.

In the above embodiment, only the conveying velocity of the sheet has been detected and the rotational speed of the convey motor has been adjusted. However, as an application example, by detecting an appearance of the stripe on a plurality of points in the crosstrack direction shown in FIG. 4, a state in which the chart 401 is conveyed while drawing an arc is detected, and by rotating the motors 201 and 202 in FIGS. 3A to 3C at the rotational speeds in accordance with a size of such an arc, a difference between diameters of the rollers 120-L and 120-R can be corrected. Thus, the abrasion and tolerance of each roller can be corrected.

What is claimed is:

1. A sheet conveying apparatus comprising:
   conveying means for conveying an original and a pattern sheet on which a pattern is printed;
   reading means for reading the original while the original is being conveyed by said conveying means and reading the pattern sheet while the pattern sheet is being conveyed by said conveying means;
   detecting means for detecting a conveying velocity of the pattern sheet on the basis of the pattern read by said reading means; and
   control means for controlling a conveying velocity of said conveying means on the basis of the conveying velocity detected by said detecting means,
   wherein the pattern sheet on the sheet on which the pattern is printed is a pattern, which repetitively appears in a conveying direction.

2. An apparatus according to claim 1, wherein said reading means comprises a line sensor.

3. An apparatus according to claim 2, wherein said line sensor comprises a plurality of sensors disposed in a plurality of columns.

4. An apparatus according to claim 1, wherein said repetitive pattern is a fringe pattern.

5. An apparatus according to claim 1, wherein said conveying means includes a roller and said control means controls a rotational speed of said roller of said conveying mans so as to correct for an abrasion or a tolerance of said roller.

6. An apparatus according to claim 1, wherein said conveying means comprises two driving means for respectively driving at least two rollers, and said at least two rollers are disposed in the direction perpendicular to the conveying direction.

7. An apparatus according to claim 6, wherein said detecting means detects a state in which the pattern sheet is conveyed while moving in an arc on the basis of the pattern, and said control means controls a rotational speed of the roller of each of said two driving means in accordance with a size of said arc detected by said detecting means.

8. A sheet conveying apparatus comprising:

conveying means including two driving means for driving at least two rollers, respectively, for conveying a sheet;

reading means for reading a pattern on a sheet while the sheet on which the pattern is printed is conveyed by said conveying means;

detecting means for detecting a status in which the pattern sheet is conveyed in an arc shape, on the basis of the pattern read by said reading means; and control means for controlling a rotational speed of said roller of a respective one of said two driving means in accordance with a size of the arc detected by said detecting means, wherein the pattern on the sheet on which the pattern is printed is a pattern, which repetitively appears in a conveying direction.

9. An apparatus according to claim 8, wherein said reading means comprises a line sensor.

10. An apparatus according to claim 8, wherein said at least two rollers are disposed in a direction at a right angle relative to the conveying direction.

11. An apparatus according to claim 8, wherein said detecting means detects the pattern at a plurality of points in a direction at a right angle relative to a conveying direction.

12. An apparatus according to claim 8, wherein the pattern is a striped pattern.

13. An apparatus according to claim 8, wherein said control means controls rotational speeds of said at least two rollers so as to correct an abrasion or a tolerance of said at least two rollers.

14. A sheet conveying apparatus comprising:

conveying means including two driving means for driving at least two rollers, respectively, for conveying a sheet;

detecting means for detecting conveying velocities of a sheet at a plurality of points in a direction at a right angle relative to a conveying direction; and control means for controlling a rotational speed of a respective one of said two driving means in accordance with a conveying velocity of the sheet at each of the plurality of points detected by said detecting means; and reading means for reading a pattern on a sheet while the sheet with the pattern is being conveyed by said conveying means, wherein said detecting means detects the conveying velocity of the sheet with the pattern at each of the plurality of points, on the basis of the pattern read by said reading means.

15. An apparatus according to claim 14, wherein said reading means comprises a line sensor.

16. An apparatus according to claim 15, wherein said line sensor comprises a plurality of sensors disposed in a plurality of columns.

17. An apparatus according to claim 14, wherein the pattern of the sheet is a repetitive pattern which repetitively appears in the conveying direction.

18. An apparatus according to claim 17, wherein the repetitive pattern is a striped pattern.

19. An apparatus according to claim 14, wherein said control means controls a rotational speed of a respective one of said two driving means so as to correct for an abrasion or a tolerance of said two rollers.

20. An apparatus according to claim 14, wherein said at least two rollers are disposed in a direction perpendicular to the conveying direction.

21. A method for conveying a sheet comprising the steps of:

conveying an original and a pattern sheet on which a pattern is printed;

reading the original while the original is being conveyed and reading the pattern sheet while the pattern sheet is being conveyed;

detecting a conveying velocity of the pattern sheet on the basis of the read pattern; and controlling a conveying velocity of the original and the pattern sheet on the basis of the conveying velocity detected by said detecting means, wherein the pattern on the sheet on which the pattern is printed is a pattern, which repetitively appears in a conveying direction.

22. A method according to claim 21, wherein said reading step is performed by a line sensor.

23. A method according to claim 22, wherein said line sensor comprises a plurality of sensors disposed in a plurality of columns.

24. A method according to claim 21, wherein the repetitive pattern is a fringe pattern.

25. A method according to claim 21, wherein said conveying step is performed by a roller and said method further comprises the step of controlling a rotational speed of said roller so as to correct for an abrasion or a tolerance of said roller.

26. A method according to claim 21, wherein said conveying step is performed by two driving means for respectively driving at least two rollers, and said at least two rollers are arranged in the direction perpendicular to the conveying direction.

27. A method according to claim 26, wherein said detecting step detects a state in which the pattern sheet is conveyed while moving in an arc on the basis of the pattern, and said control step controls a rotational speed of the roller of each of said two driving means in accordance with a size of said arc detected by said detecting step.

28. A method for conveying a sheet comprising the steps of:

conveying a sheet performed by at least two driving means for driving at least two rollers, respectively;

reading a pattern on a sheet while the sheet on which the pattern is printed is conveyed;

detecting a status in which the pattern sheet is conveyed in an arc shape, on the basis of the read pattern; and controlling a rotational speed of said roller of a respective one of said two driving means in accordance with a size of the detected arc, wherein the pattern on the sheet on which the pattern is printed is a pattern, which repetitively appears in a conveying direction.

29. A method according to claim 28, wherein said reading step is performed by a line sensor.

30. A method according to claim 28, wherein said at least two rollers are disposed in a direction at the right angle relative to a conveying direction.

31. A method according to claim 28, wherein said detecting step means detects the pattern at a plurality of points in a direction at a right angle relative to a conveying direction.

32. A method according to claim 28, wherein the pattern is a striped pattern.

33. A method according to claim 28, wherein said control step controls rotational speeds of said at least two rollers so as to correct an abrasion or a tolerance of said at least two rollers.

34. A method for conveying a sheet comprising the steps of:

conveying a sheet by at least two driving means for driving at least two rollers, respectively;

detecting conveying velocities of a sheet at a plurality of points in a direction at a right angle relative to a conveying direction;

controlling a rotational speed of a respective one of said two driving means in accordance with a conveying velocity of the sheet at each of the plurality of points detected in said detecting step; and reading a pattern on a sheet while the sheet with the pattern is being conveyed in said conveying step, wherein said detecting steps detects the conveying velocity of the sheet with the pattern at each of the plurality of points, on the basis of the pattern read by said reading step.

35. A method according to claim 34, wherein said reading step is performed by a line sensor.

36. A method according to claim 35, wherein said line sensor comprises a plurality of sensors disposed in a plurality of columns.

37. A method according to claim 34, wherein the pattern of the sheet is a repetitive pattern which repetitively appears in the conveying direction.

38. A method according to claim 37, wherein the repetitive pattern is a striped pattern.

39. A method according to claim 34, wherein said control step controls a rotational speed of a respective one of said two driving means so as to correct for abrasion or a tolerance of said two rollers.

40. An apparatus according to claim 34, wherein said at least two rollers are disposed in a direction perpendicular to the conveying direction.

* * * * *

UNITED STATES PATENT AND TRADEMARK OFFICE
CERTIFICATE OF CORRECTION

PATENT NO. : 6,128,106

DATED : October 3, 2000

INVENTOR(S): MASAO WATANABE, ET AL.

It is certified that error appears in the above-identified patent and that said Letters Patent is hereby corrected as shown below:

<u>COLUMN 9</u>:

Line 6, "mans" should read --means--.

<u>COLUMN 10</u>:

Line 26, "is" should read --are--.

Signed and Sealed this

Twenty-second Day of May, 2001

Attest:

NICHOLAS P. GODICI

Attesting Officer          Acting Director of the United States Patent and Trademark Office